Aug. 11, 1953   E. GERBER   2,648,303
EMBROIDERING MACHINE
Filed Feb. 23, 1952   8 Sheets-Sheet 3

INVENTOR.
EUGENIO GERBER
BY

Aug. 11, 1953  E. GERBER  2,648,303
EMBROIDERING MACHINE
Filed Feb. 23, 1952  8 Sheets-Sheet 4

INVENTOR.
EUGENIO GERBER

Aug. 11, 1953     E. GERBER     2,648,303
EMBROIDERING MACHINE

Filed Feb. 23, 1952     8 Sheets-Sheet 5

INVENTOR.
EUGENIO GERBER
BY

Aug. 11, 1953        E. GERBER        2,648,303
EMBROIDERING MACHINE

Filed Feb. 23, 1952        8 Sheets-Sheet 6

INVENTOR.
EUGENIO GERBER
BY

Patented Aug. 11, 1953

2,648,303

UNITED STATES PATENT OFFICE 2,648,303

EMBROIDERING MACHINE

Eugenio Gerber, Buenos Aires, Argentina; Marcelo Sanchez Sorondo, curator of the estate of said Eugenio Gerber, deceased, assignor to Gerber, Sociedad de Responsabilidad Limitada, Buenos Aires, Argentina Application February 23, 1952, Serial No. 272,947

6 Claims. (Cl. 112—98)

My present invention relates to certain new and useful improvements in embroidering machines, and more particularly refers to an embroidering machine of the class described in my co-pending application Serial No. 135,923, wherein pairs of co-operating mechanical embroidering hands handle usual sewing or embroidering needles which have the needle eye provided at one end thereof, and cause these needles to pass to and fro through the cloth to be embroidered and to be inverted in longitudinal direction after each passage through the cloth.

The main object of this invention is to provide an improved embroidering machine of the class referred to, wherein the co-operating mechanical embroidering hands are respectively arranged above and below a working table and operate in vertical direction, with the advantageous result that this arrangement is particularly suitable for the construction of embroidering machines for private use.

Another object of my invention is to provide an improved embroidering machine of the class referred to, wherein the inversion of the embroidering needle, which is carried out by the rotative needle holder of each mechanical embroidering hand, takes place during the last part of the return stroke of the embroidering hand. This feature is advantageous insofar as the stroke of the reciprocating mechanical embroidering hands is considerably shortened and as by virtue hereof not only the size of the structure of each embroidering hand may be reduced, but also the embroidering hands may be reciprocated by means of crank shafts instead of gearings. In this manner the driving mechanism of the embroidering machine is essentially simplified.

Still another object of the invention is to provide an improved embroidering machine of the class referred to, wherein the mechanical embroidering hands are so operated that each of them, after pushing the embroidering needle through the cloth to be embroidered and delivering it to the co-operating embroidering hand at the opposite side of said cloth, is caused to move away from the cloth to an intermediate position at a small distance from the latter sufficient to permit the passage of a thread-engaging roller provided at the free end of the lever of the thread-pulling device associated with each embroidering hand. The advantage obtained by this arrangement consists in that the working conditions of the thread-pulling device are considerably improved.

A further object of the invention is to provide an improved embroidering machine of the class referred to, wherein the thread-pulling devices of each pair of cooperating mechanical embroidering hands are so arranged that their oscillatory levers pull the embroidery thread through the cloth to be embroidered in straight direction i. e. without forming an angle at the point where it passes through the cloth, with the advantageous result that during the passages of the thread through the cloth the meshes of the latter are not unduly widened.

An additional object of my invention is to provide an improved embroidering machine of the class referred to, wherein the lever of each thread-pulling device comprises two parallel co-operating arms and the thread-engaging roller carried by the free end of said arms comprises two separable component parts provided with engaging male and female portions, the arrangement of said arms being such that a spreading movement of the same separates the component parts of the roller thereby ensuring the disengagement of the embroidery thread.

Still another object of the invention is to provide an improved embroidering machine of the class referred to, particularly destined for private use or home industry, wherein the working table is provided with the guide bars for a movable embroidery frame, which thus may be readily moved from one stitch point to another either by hand or by means of a detachable pantograph, the use of the latter being particularly advantageous insofar as it enables the embroiderers to transfer an embroidery pattern from a magazine or the like to the cloth to be embroidered and to directly embroider said pattern on this cloth.

With these objects and advantageous features in view, the present invention comprises the arrangement, combination and construction of parts as will be hereinafter fully explained with particular reference to the accompanying drawings, which by way of example only illustrate a preferred embodiment of the invention and on which:

Figure 1:
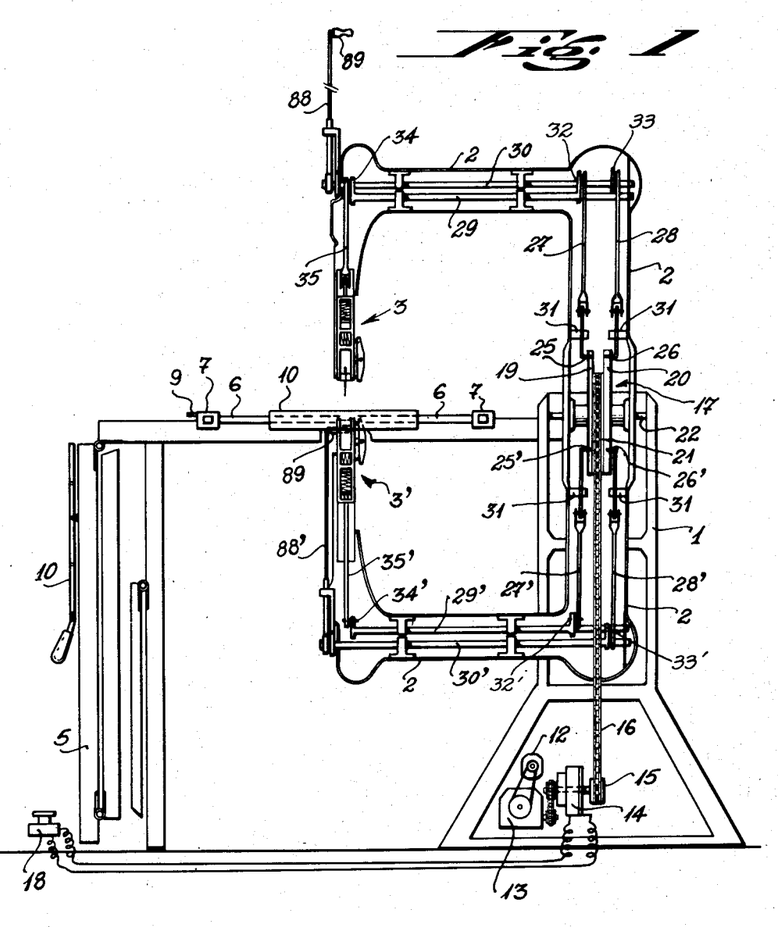
Figure 1 is a partly sectional side view of an embroidering machine for private use incorporating the novel features of the invention.
Figure 2:
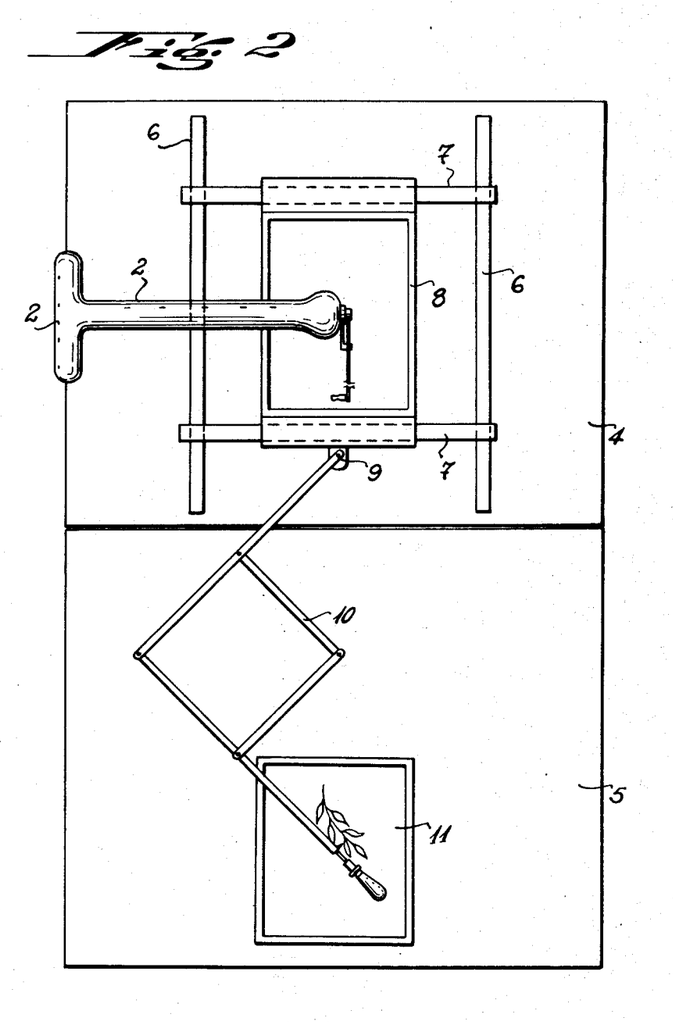
Figure 2 is a schematic plan view of the machine according to Fig. 1.

The embroidering machine according to the invention, designed as shown by way of example on the accompanying drawings and particularly destined for private use or home industry, comprises a frame 1 for carrying a casing 2 containing the driving mechanism of the embroidering machine, which operates with but one pair of co-operating mechanical embroidering hands 3, 3' (Fig. 1) arranged above, respectively below, a working table 4 conveniently provided with an articulated enlargement 5. On the table 4 two pairs of parallel guide rods 6, 7, of which the rods 6 are fixed, whereas the rods 7 are movable along the first ones, serve for movably mounting an embroidery frame 8 which at 9 is removably connected with a pantograph 10 arranged on the enlargement 5 of the table 4, for the purpose of adjusting the embroidery frame 8 after each stitch in accordance with a given embroidery pattern 11 placed on said enlargement of the working table (Fig. 2).

The lower portion of the frame 1 carries an electric motor 12 which by means of a gear box 13 and of an electromagnetic clutch 14 is operatively connected to a pulley 15 which in turn by means of a belt 16 is connected with an eccentric device 17 of the driving mechanism of the embroidering machine. The operation of the motor 12 is controlled by means of a pedal switch 18 or the like.

The eccentric device 17 (Fig. 3) comprises a pair of disks 19, 20 conveniently interconnected by a pulley 21 acted upon by the belt 16 and mounted together with said disks on a shaft 22. Each of the disks 19, 20 is provided on its outer surface with an endless eccentric groove 23, 24 (Figures 4 and 5, respectively), engaged by pins 25, 25', 26, 26' of connecting rods 27, 27' and 28, 28', respectively, whereby the rotative motion of the disks 19, 20 is transmitted and transformed into partial rotations in one and the opposite direction of crank shafts 29, 29' and 30, 30', respectively.

Guide members 31 provided inside the casing 2 for the rods 27, 27', 28, 28' maintain the respective pins 25, 25', 26, 26' in engagement with the eccentric grooves 23, 24, respectively. The connection of the rods 27, 27' and 28, 28' with the respective shafts 29, 29' and 30, 30' is effected by the cranks 32, 32' and 33, 33'.

Figure 3:
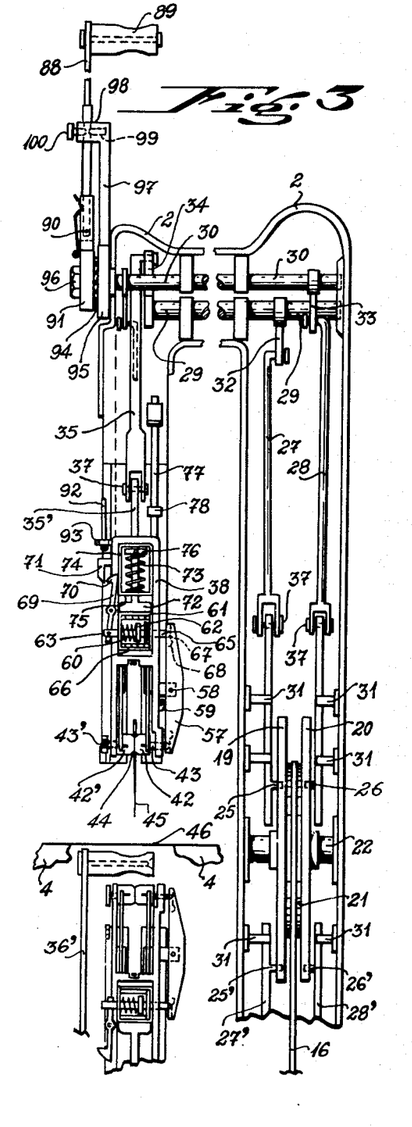
Figure 3 is a fragmentary partly sectional side view of the driving mechanism of the embroidering hands and their thread-pulling devices of the machine according to Fig. 1.

The crank shafts 29, 29' by means of cranks 34, 34' and connecting rods 35, 35' operate the embroidering hands 3, 3' (Fig. 1) whereas the crank shafts 30, 30' operate the thread-pulling levers 80, 88' associated with said embroidering hands 3, 3' respectively. It has to be mentioned that the connecting rods 27, 27', 28, 28', 35, 35' are provided with articulations 37 (Fig. 3).

Figure 8:
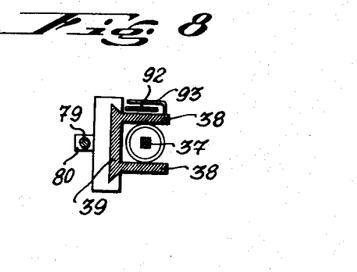

Each of the mechanical embroidering hands comprises a U-shaped frame 38 (Fig. 8) which by means of a dove-tail connection 39 is slidably mounted on a guide plate 40. The frame 38 forms a pair of supporting arms 31 which at their free ends are provided with suitable bearings for carrying the composite needle holder 42, 42'. The gudgeons 43, 43' of the component parts 42, 42' of the needle holder project beyond the outer surfaces of the supporting arms 41. The needle holder parts 42, 42' on their opposite surfaces are provided each with a transverse groove, both grooves forming, in the closed condition of the needle holder, a channel 44 for receiving the embroidering needle 45.

For ensuring a firm grip of the needle, the surfaces of the grooves are conveniently corrugated. The needle holder parts are advantageously so constructed that projecting or male portions provided on the surface of one needle holder part enter into corresponding cavities or female portions of the other without, of course, obstructing the needle channel 44. This construction permits a reduction of the cross section of the needle channel 44 and enables the needle holder 42, 42' to efficiently operate with needles of different thickness.

Figure 6:
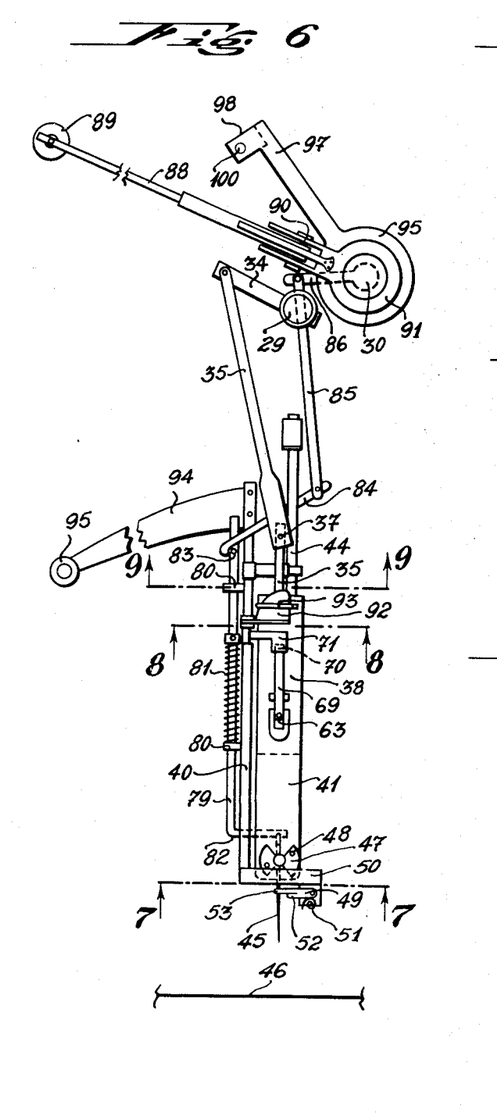
Figure 6 is a detail view showing in cross section the crank shafts with their connecting rods for operating one of the embroidering hands and its associated thread-pulling device.
Figure 7:
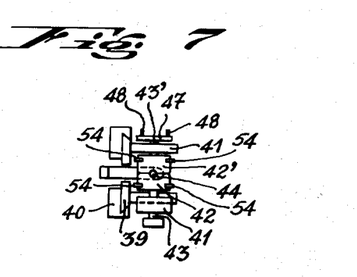
Figures 7, 8, 9 are cross sectional views taken along the lines 7—7, 8—8, 9—9, respectively, of Fig. 6.

In order to invert the embroidering needle 45 in its longitudinal direction after each passage through the cloth to be embroidered 46, the needle holder 42, 42' has to make one half of a revolution. This rotative movement of the needle holder is derived from the return stroke of the reciprocating embroidering hand. For this purpose the gudgeon 43' of the needle holder part 42' is provided with a cam member in the form of a two-wing Maltese cross 47 and each wing carries a laterally projecting pin 48 (Fig. 6). This cam member 47 co-operates with a stop device 49 pivotally mounted on an arm 50 provided at the front end of the stationary guide plate 40; the arrangement of said stop device 49 being such that the same in one direction may be oscillated over an angle of 90° against the pressure of a suitable spring 51, whereas in the opposite direction it is prevented from oscillating by a suitable stop. The stop device 49 consists of a lower cam portion 52 arranged on the same plane as the wings of the cam member 47 and of a higher cam portion 53 situated adjacent the cam portion 52 so as to come into contact with the lateral pins 48 of the cam member 47 (Fig. 6).

Figure 14:
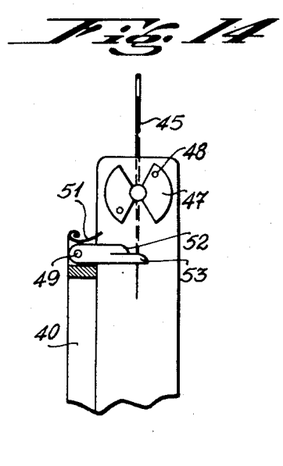
Figures 14 to 16 are schematic detail views showing the needle holder of an embroidering hand before, during and after inverting the embroidering needle.
Figure 15:
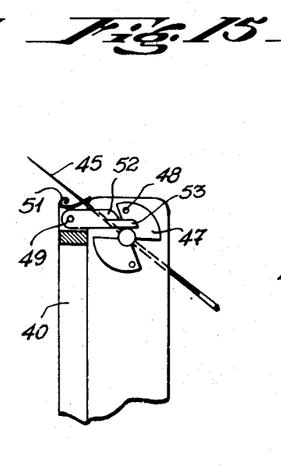
Figure 16:
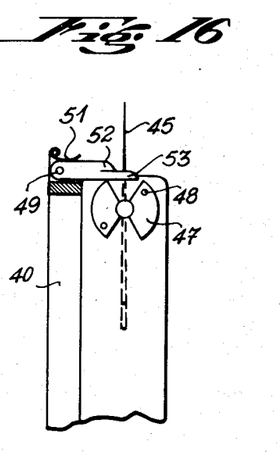
Figure 17:
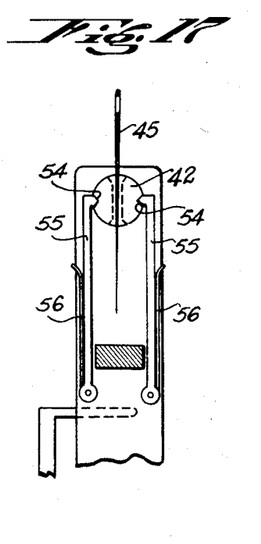
Figures 17 to 19 are schematic detail views of stop means in co-operation with the cam device of the needle holder, before, during and after inverting the embroidering needle.
Figure 18:
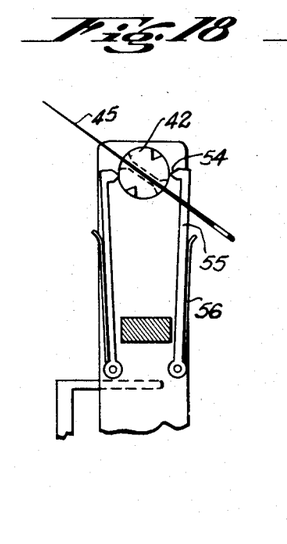
Figure 19:
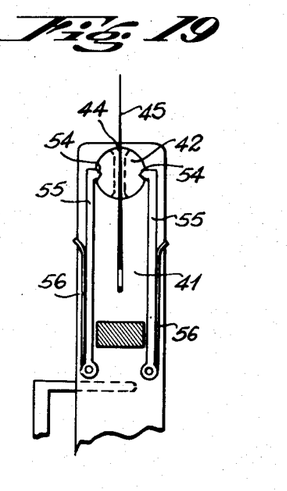
Figure 20:
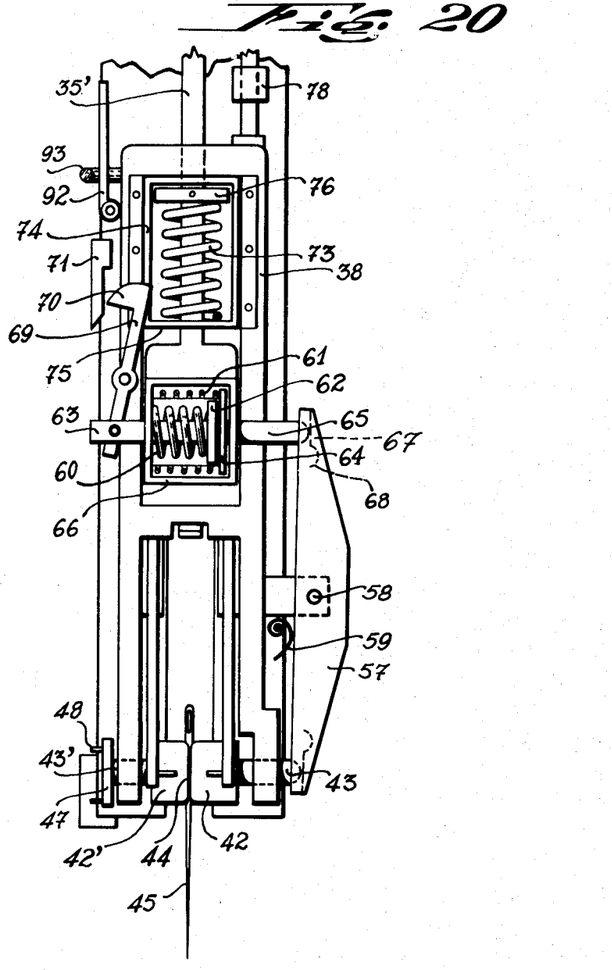
Figure 20 is an enlarged view of the needle holding means shown in Fig. 3.

During the return stroke of the embroidering hand (Figures 14–16) the cam member 47 at first strikes the lower cam portion 52 of the stop device 49 (Fig. 16) and thereby is rotated over about 90° (Fig. 15). Thereafter the pin 48 comes into contact with the higher cam portion 53 which causes a further rotation over about 90° of the cam member 47 and therewith of the needle holder part 42'. As the two parts 42 and 42' are firmly pressed together, it is sufficient that only one of said parts be driven by a cam member as described. In order to ensure that the rotating movement of the needle holder be exactly one half of a revolution (Fig. 14) the needle holder parts 42, 42' are provided at diametrically opposite points with small grooves engaged by corresponding teeth 54 of pairs of oscillating levers 55 pivotally mounted on the inner surface of the supporting arms 41 under the pressure of suitable springs 56. As soon as the needle holder 42, 42' is rotated by means of the co-operation of the cam member 47 with the stop device 49, the levers 55 of each pair are slightly moved apart, but when one half of a revolution of the needle holder is at the point of being completed, then the teeth 54 of said levers 55 slide into the grooves of the needle holder parts 42, 42' and complete the said half of a revolution (Figures 17-19).

The opening and closing of the needle holder 42, 42' is effected by an axial displacement of the needle holder part 42. For this purpose the end portion of the respective supporting arm 41 is elbowed as shown in Fig. 3 and the free end of the correspondingly elongated gudgeon 43 projecting beyond the elbowed portion of the arm 41 is in contact with a lever 57 pivoted at 58 and acted upon by a small spring 59. This spring 59 serves the purpose of neutralizing the action of the lever 57 upon the gudgeon 43, as soon as a spring device which by means of said lever causes the closure of the needle holder ceases acting upon said lever.

The spring device for closing the needle holder 42, 42' comprises a high pressure spring 60 and a low pressure spring 61, of which the first one acts upon a disk 62 provided with a stem 63, whereas the second one acts in the same direction upon a larger disk 64 provided with a stem 65, the two disks being arranged side by side with the stems projecting in opposite direction out of the casing 66 which is slidable within the frame 38. The free end of the stem 65 is in contact with a stop 67 provided on the lever 57 or forming part thereof. The stop 67 comprises a recess 68 so arranged that, if the casing 66 containing the spring device moves forward in the direction towards the cloth to be embroidered, the free end of the stem 65 will slide into the recess and will slide back upon the surface of the stop 67, when said casing moves backwards. The said recess 68 is so deep that when the stem 65 extends into the same, the pressure of the two springs 60 and 61 will be supported by the side wall of the casing 66 and will not act upon the lever 57, so that in this moment this lever under the action of its spring 59 will permit the needle holder to be opened or released and the needle 45 to be readily withdrawn therefrom.

The free end of the stem 63 projecting beyond the opposite side of the casing 66 is movably connected with one end of the lever 69, the opposite end of which is provided with a nose 70, which at the end of the return stroke of the embroidering hand co-operates with a hook 71 fixedly mounted on the stationary guide plate 40, with the result that the stem 63 and disk 62 are moved to and retained in a position out of the contact with the disk 64 and that thus no pressure is executed by the strong pressure spring 60 upon the disk 64, stem 65 and lever 57. In this position the low pressure spring 61 alone acts through the disk 64 and stem 65 upon the lever 57 and the needle holder parts 42 and 42' are only slightly pressed together and permit an axial movement of the needle 45 in the channel 44 of the needle holder. Such axial movement of the embroidering needle 45 in the direction towards the cloth to be embroidered 46 is required each time the needle has been inverted in its longitudinal direction and this operation is effected at the end of the return stroke of the embroidering hand, i. e. when the latter is motionless.

At the end of the forward stroke of the embroidering hand, the needle holder 42, 42' must be opened so as to permit the embroidering needle 45 to be taken out, which means that no pressure at all should be exerted at this moment upon the needle holder part 42. This may be achieved, as already explained, by moving the stem 65 into alignment with the recess 68 of the stop portion 67 of the lever 57. For this purpose the casing 66 has to be moved forwards over a very short distance, and for this reason said casing by means of a cross bar 72 is connected with the rods 35, 35' which in turn are interconnected by an articulation 37 and of which the rod 35' is under the action of a pressure spring 73 arranged within a casing 74 and abutting with one end against the casing wall 75 and with the opposite end against a disk 76 fixedly mounted on said rod 35'. This rod 35' freely extends through corresponding openings of the front and rear walls of the casing 74 and this casing is fixedly secured to the frame 38 of the embroidering hand. In accordance herewith the arrangement of the driving rods 35, 35' is such that the same do not directly operate the embroidering hand, but indirectly through the spring 73 and the casing 74 and that, when the embroidering hand has been pushed forward to its end position adjacent the cloth 46, the rods 35, 35' have not reached the end position of their forward stroke, but continue moving in the direction towards the cloth, thereby compressing the spring 73 and moving the casing 66 to the position in which the stem 65 is in alignment with the recess 68, so that now the needle holder 42, 42' of the embroidering hand is without any pressure and the needle 45 may be readily withdrawn.

On the other hand, as already pointed out, the needle holder 42, 42' of any embroidering hand is closed before it starts moving away from the cloth 46, because at the moment at which the driving rods 35, 35' change from the forward to the backward stroke, the previously compressed spring 73 now expands and instantaneously withdraws the casing 66 bringing the stem 65 into contact with the stop portion 67 of the lever 57 with the result that the latter closes the needle holder 42, 42' under application of the combined pressures of the two springs 60 and 61 just before the rods 35, 35' start pulling the embroidering hand and its closed needle holder 42, 42' away from the cloth 46 and causing the same to pull the threaded needle 45 through said cloth.

As will be understood from the preceding description, the forward stroke of the embroidering hand is finished before the driving rods 35, 35' reach their end position. Therefore, in order to prevent the embroidering hand from moving forwards beyond the admitted limit, each embroidering hand comprises a rod 77 which in combination with a stop 78 mounted on the stationary guide plate 40 limits the forward movement of the embroidering hand.

As has been already mentioned, the embroidering needle 45 after being inverted in longitudinal direction, it must be pushed forward in the channel 44 of the needle holder 42, 42'. For this purpose each embroidering hand comprises a push rod 79 (Fig. 6), which is movably mounted in suitable bearings 80 on the stationary guide plate 46 and is under the action of a pressure spring 81. The front end of the rod 79 is bent so as to form an arm 82 extending into the free space between the supporting arms 41, where the same comes into contact with the end of the inverted embroidering needle 45 in the needle holder 42, 42' and pushes the same forwards. The rear end of the rod 79 carries a pin 83 so arranged that it is engaged by the rod 84 which by means of the articulated rods 85 and 86 is operatively connected to the driving or crank shaft 30, in such a manner that a partial rotation of this shaft produces the forward movement of the push rod 79 and therethrough of the needle 45 in the needle holder 42, 42', whereas the backward movement of said push rod is produced by the pressure spring 81.

Figure 9:
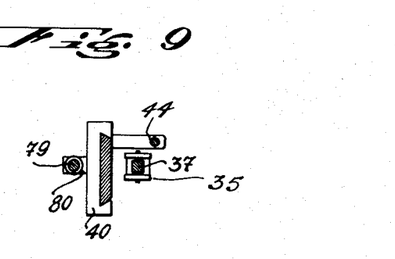
Figures 10, 11:
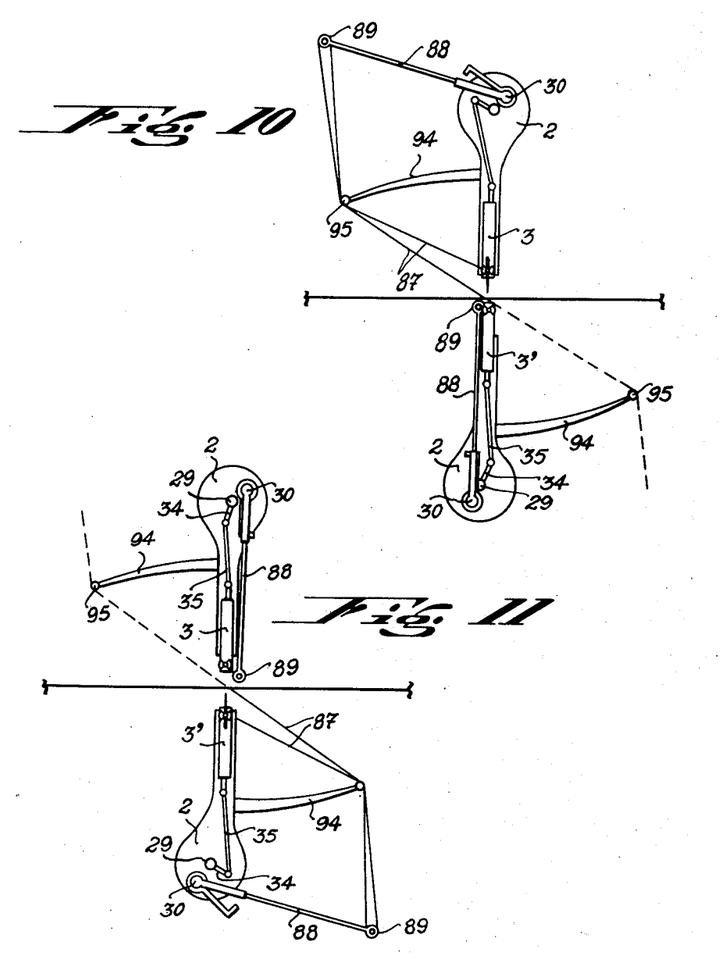
Figures 10 and 11 are schematic front views of a pair of co-operating embroidering hands and their thread-pulling devices in different positions for illustrating the direction of the embroidery thread while being pulled through the cloth.

After each passage of the embroidering needle 45 through the cloth 46, the embroidery thread 87 has to be also pulled therethrough. For this purpose each embroidering hand has associated therewith a thread-pulling device. This device comprises a lever 88 carrying at its free end a guide roller 89 and at its opposite end by means of a spring-loaded articulation 90 and of a collar 91 is loosely mounted on the shaft 30. The spring-loaded articulation 90 permits a lateral oscillation of the lever 88 which is necessary for causing the guide roller 89 to disengage the embroidery thread 87 shortly before the thread-pulling lever reaches its end position adjacent the cloth 46 (Fig. 10, lower part). The lateral oscillation of the lever 88 is performed when the latter during its movement to the said end position slides over the curved edge of a spring-loaded oscillatory plate 92 which is pivotally mounted on the stationary guide plate 40 (Fig. 9) and which, when the thread-pulling lever 88 moves in the opposite direction from the end position (Fig. 10, lower part) to the initial position (Fig. 10, upper part), by means of a hook 93 provided on the frame 38 of the embroidering hand, is moved to a position parallel to said frame 38 and is retained in this position until the embroidering hand makes its next forward stroke. In the meantime the thread-pulling lever 88 returns to its initial position without getting in touch with the plate 92.

An arm 94 mounted on the stationary guide plate 40 and provided at its free end with a loose guide roller 95 serves for guiding the embroidery thread 87 while being pulled through the cloth 46 in one and the opposite direction (Figures 10, 11).

These Figures 10 and 11 illustrate a novel and advantageous feature of the thread-pulling device, consisting in that the levers 88 of the pair of co-operating devices pull the thread 87 through the cloth 46 on a straight line i. e. without forming an angle which is always liable to widen the meshes of the cloth.

The operation of the lever 88 proceeds by means of a friction clutch 94 (Fig. 3) provided between the loose collar 91 and a fixed collar 95, said clutch being adjustable by means of a nut 96. The adjustment of the friction of the clutch 94 shall be such that the pulling lever 88 operated thereby is unable to tear the embroidery thread to pieces, but that this lever is detained by the loop formed by said thread at any point determined by the length of said thread which, as will be readily understood, is shortened by each stitch. Such an adjustment of the friction clutch, however, does not enable the lever 88 to pull the embroidering thread 87 through a relatively strong cloth of narrow meshes, and it is, therefore, necessary to provide for an additional force for the operation of the lever 88 during its thread-pulling stroke. For this purpose the fixed collar 95 is provided with an arm 97, which at its free end carries a lever-engaging device 98. This device may be of any known construction, in the case as shown, for instance, in Figure 3, the arrangement of the same being such that a fork provided with a leaf spring 99 and an adjustment screw 100 engages the lever 88 and moves the same along with the arm 97 until the resistance of the thread 87 exceeds the pressure executed by the spring 99, at which moment the lever is disengaged and left standing i. e. at the point where the loop of the embroidering thread detains the said lever.

Figure 12:
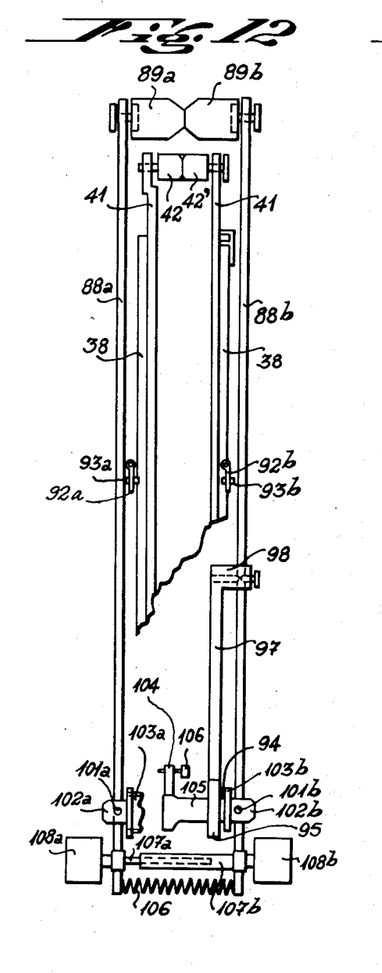
Figures 12 and 13 show an improved construction of the thread-pulling lever having a composite guide-roller and a pair of parallel rods, in closed and open position, respectively.
Figure 13:
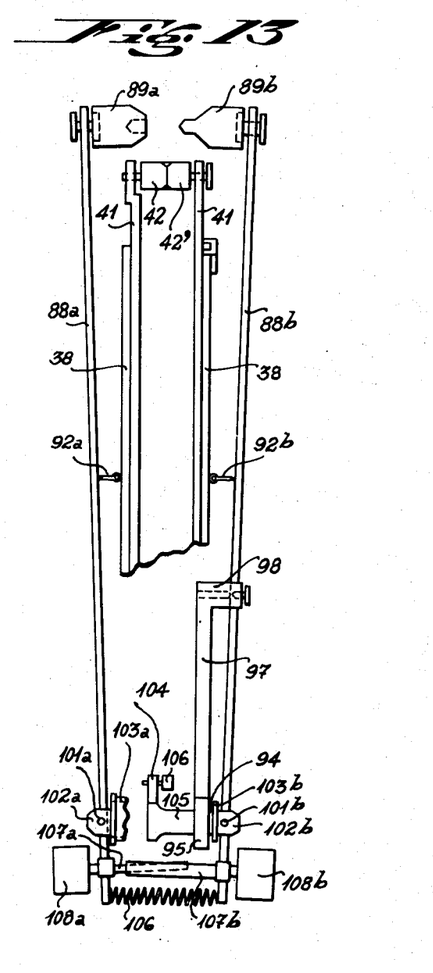

Figures 12 and 13 show an improved embodiment of a thread-pulling device, which comprises a lever formed by two parallel rods 88a and 88b and a composite guide roller so arranged that the component parts thereof 89a and 89b have engaging male and female portions and the separation of said component parts enables the roller to readily disengage the embroidery thread. For effecting the separation of the component parts of the roller 89a, 89b, spring-loaded oscillatory plates 92a, 92b and hooks 93a, 93b are provided as described with reference to Fig. 3 said plates operating in such a manner that when the rods 88a, 88b are moved towards the cloth, they are caused by the curved edges of said plates to oscillate outwardly thereby disengaging the male and female portions of the component parts of the guide roller 89a, 89b. The rods 88a, 88b are rotatively mounted at 101a, 101b between pairs of lug plates 102a, 102b and by means of the latter are connected with pivots 103a, 103b, rotatively mounted in suitable bearings on the casing 2 (Fig. 3) and the crank 104 of the short shaft 105 is operatively connected with the driving shaft 30 by means of a crank 106 of the latter. The operative connection between the lug plates 102b and the short crank shaft 105 proceeds as in the case described with reference to Fig. 3, by means of a friction clutch 94, collar 95, arm 97 and lever-engaging device 98. The rear ends of the rods 88a and 88b are interconnected by a spring 106 and a pair of co-operating arms 107a and 107b and are provided each with a counter-weight 108a, 108b. The advantage of this improved thread-pulling device consists in that the disengagement of the embroidery thread by the separation of the component parts of the guide roller affords an absolute safety of working of the device and the possibility of almost entirely using up the embroidery thread.

As already stated, the operation of the thread-pulling device is effected by the crank shaft 30. A second crank shaft 29 operates the embroidering hand by means of the rods 35, 35'. The crank shafts 29 and 30 in turn are operated by means of the rods 27 and 28, respectively, provided each with an articulation, and the respective eccentrics 19 and 20 (Fig. 3).

Figure 4:
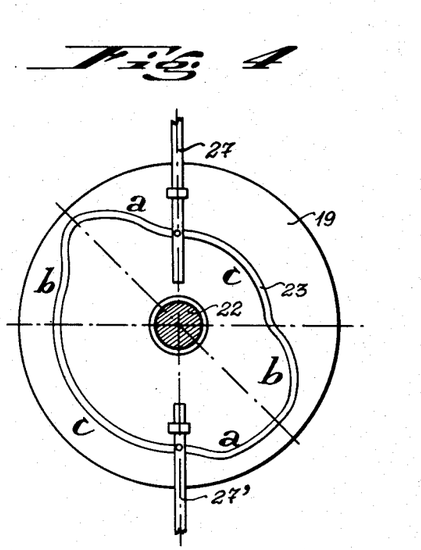
Figures 4 and 5 are front views of the cam devices of the driving mechanism for operating the embroidering hands and the thread-pulling devices, respectively.
Figure 5:
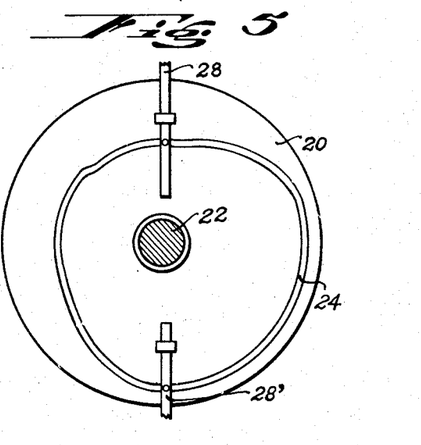

The operation of the machine is as follows:

Figures 3, 4 and 5 show the operative parts of the embroidering machines in their initial positions, viz. the upper embroidering hand in its position withdrawn from the cloth 46 and the embroidering needle 45 has already been pushed forwards in the released needle holder 42, 42' so that the next stitch can be executed.

Now the switch 18 is operated and the motor 12 is started. The eccentrics 19, 20 are thus caused to rotate in clockwise direction. The pins 25, 25' in the eccentric groove 23 slide along the respective curves a, a, the rod 27 is moved upwards, while the rod 27' remains motionless for a short moment, but thereafter moves speedily downwards. These movements of the rods 27, 27' produce corresponding partial rotations of the respective crank shafts 29, 29', whereby the two embroidering hands are moved from the positions shown in Fig. 3 to positions adjacent the cloth 46.

The eccentric disk 19 continues rotating, the guide pins 25, 25' slide along the respective curves b, b. The corresponding movements of the rods 27, 27' transmitted to the crank shafts 29, 29' produce the withdrawal of the upper embroidering hand to an intermediate position at a short distance from the cloth 46 and of the lower embroidering hand, which gripped the needle 45, to the end position distant from said cloth.

During the last part of this return stroke, the lower embroidering hand, by means of one half of a revolution of its needle holder 42, 42', performs the inversion of the needle 45, and thereafter, while the embroidering hand is motionless in its withdrawn position, the push rod 79, 82 pushes the needle 45 forwards within the channel 44 of the released needle holder 42, 42'.

The two embroidering hands remain in the cited positions until the completion of one half of the revolution of the eccentric disk 19 in accordance with the course of the respective curve c, c, whereafter the movements as above described, but with regard to the respective opposite embroidering hands are repeated.

During the same time, the eccentric disk 20 also makes a revolution. The guide pins 26, 26' engaging and sliding along the eccentric groove 24, by means of the rods 28, 28' and crank shafts 30, 30', move the thread-pulling levers 88, 88' from the position of Fig. 10 to that of Fig. 11 and thereafter in opposite direction from the position of Fig. 11 to that of Fig. 10.

In connection herewith it may be pointed out that the movements of the thread-pulling levers are coordinated with the movements of the embroidering hands in the following manner. As soon as one of the embroidering hands has gripped the needle and has started its return stroke, the thread-pulling lever associated therewith also starts its return stroke and while passing between the cloth and the returning embroidering hand (Fig. 3, lower hand) engages the embroidery thread and pulls it through the cloth. During the same time, the opposite embroidering hand has been withdrawn over a short distance from the cloth (Fig. 3, lower hand) and the thread-pulling lever belonging to said opposite embroidering hand moves from the position of Fig. 3 (lower hand), to that of Fig. 3 (upper hand). The two thread-pulling levers remain in these positions until their respective embroidering hands make a new stitch as above described.

It has to be understood that the present invention is by no means restricted to the embodiment as described and shown, but that alterations and amendments may be made therein, and that such alterations and amendments are to be considered as falling within the scope of the invention as clearly set forth in the appended claims.

What I claim as new and desire to secure by Letters Patent is:

1. Embroidering machine, comprising in combination at least one pair of co-operating mechanical embroidering hands, each provided with a rotative needle holder capable of handling a threaded embroidering needle having the needle eye provided at one end thereof and of inverting the direction of the needle after each passage through the cloth to be embroidered; a thread-pulling device associated with each embroidering hand, and a driving mechanism for reciprocating the embroidering hands and for oscillating the thread-pulling device; transmission means provided in each embroidering hand for imparting to its needle holder one half of a revolution derived from the linear movement of the reciprocating embroidering hand; a spring device incorporated in each embroidering hand for operating a lever and transmitting therethrough to the needle holder a strong pressure for firmly grasping the embroidering needle, a weak pressure for permitting a longitudinal adjustment of the needle in the needle holder and no pressure at all for permitting the needle to be taken out of the needle holder; the said driving mechanism comprising a first eccentric for the embroidering hands and a second eccentric for the thread-pulling devices; a pair of crank shafts for the pairs of co-operating embroidering hands and a pair of crank shafts for the pairs of co-operating thread-pulling devices, and connecting rods between said eccentrics and said crank shafts as well as between the latter and the embroidering hands and the thread-pulling devices, respectively.

2. Embroidering machine, comprising in combination at least one pair of vertically arranged co-operating mechanical embroidering hands, each provided with a rotative needle holder capable of handling a threaded embroidering needle having the needle eye provided at one end thereof and of inverting the direction of the needle after each passage through the cloth to be embroidered; a thread-pulling device associated with each embroidering hand, and a driving mechanism for reciprocating the embroidering hands and for oscillating the thread-pulling device; a horizontal working table between said vertically arranged co-operating embroidering hands and their associated thread-pulling devices; transmission means provided in each embroidering hand for imparting to its needle holder one half of a revolution derived from the linear movement of the reciprocating embroidering hand; a spring device incorporated in each embroidering hand for operating a lever and transmitting therethrough to the needle holder a strong pressure for firmly grasping the embroidering needle, a weak pressure for permitting a longitudinal adjustment of the needle in the needle holder and no pressure at all for permitting the needle to be taken out of the needle holder; the said driving mechanism comprising a first eccentric for the embroidering hands and a second eccentric for the thread-pulling devices; a pair of crank shafts for the pairs of co-operating embroidering hands and a pair of crank shafts for the pairs of co-operating thread-pulling devices, and connecting rods between said eccentrics and said crank shafts as well as between the latter and the embroidering hands and the thread-pulling devices, respectively.

3. Embroidering machine, comprising in combination at least one pair of co-operating mechanical embroidering hands, each provided with a rotative needle holder capable of handling a threaded embroidering needle having the needle eye provided at one end thereof and of inverting the direction of the needle after each passage through the cloth to be embroidered; a thread-pulling device associated with each embroidering hand, and a driving mechanism for reciprocating the embroidering hands and for oscillating the thread-pulling device; transmission means provided in each embroidering hand for imparting to its needle holder one half of a revolution derived from the linear movement of the reciprocating embroidering hand; said transmission means comprising a two-wing Maltese cross provided on one of the component parts of said needle holder and provided with a laterally projecting pin on each of said wings, and a spring-loaded stop member composed of a lower cam portion in alignment with said Maltese cross and of a higher cam portion in alignment with said pins, this stop member being arranged on a stationary part in such a manner that said transmission means become operative during the last part of the return stroke of the embroidering hand; a spring device incorporated in each embroidering hand for operating a lever and transmitting therethrough to the needle holder a strong pressure for firmly grasping the embroidering needle, a weak pressure for permitting a longitudinal adjustment of the needle in the needle holder and no pressure at all for permitting the needle to be taken out of the needle holder; the said driving mechanism comprising a first eccentric for the embroidering hands and a second eccentric for the thread-pulling devices; a pair of crank shafts for the pairs of co-operating embroidering hands and a pair of crank shafts for the pairs of co-operating thread-pulling devices, and connecting rods between said eccentrics and said crank shafts as well as between the latter and the embroidering hands and the thread-pulling devices, respectively.

4. Embroidering machine, comprising in combination at least one pair of co-operating mechanical embroidering hands, each provided with a rotative needle holder capable of handling a threaded embroidering needle having the needle eye provided at one end thereof and of inverting the direction of the needle after each passage through the cloth to be embroidered; a thread-pulling device associated with each embroidering hand, and a driving mechanism for reciprocating the embroidering hands and for oscillating the thread-pulling devices; transmission means provided in each embroidering hand for imparting to its needle holder one half of a revolution derived from the linear movement of the reciprocating embroidering hand; a spring device comprising a strong pressure spring and a weak pressure spring and lever means in connection with said strong pressure spring for rendering the latter ineffective, and being incorporated in each embroidering hand for operating a lever provided with a stop member including a recess portion and transmitting therethrough to the needle holder a strong pressure of the two springs for firmly grasping the embroidering needle, a weak pressure produced by the said weak pressure spring alone for permitting a longitudinal adjustment of the needle in the needle holder and no pressure at all when said spring device is brought into alignment with the recess portion of said stop member for permitting the needle to be taken out of the needle holder; the said driving mechanism comprising a first eccentric for the embroidering hands and a second eccentric for the thread-pulling devices; a pair of crank shafts for the pairs of co-operating embroidering hands and a pair of crank shafts for the pairs of co-operating thread-pulling devices, and connecting rods between said eccentrics and said crank shafts as well as between the latter and the embroidering hands and the thread-pulling devices, respectively.

5. Embroidering machine, comprising in combination at least one pair of co-operating mechanical embroidering hands, each provided with a rotative needle holder capable of handling a threaded embroidering needle having the needle eye provided at one end thereof and of inverting the direction of the needle after each passage through the cloth to be embroidered; a thread-pulling device associated with each embroidering hand, and a driving mechanism for reciprocating the embroidering hands and for oscillating the thread-pulling device; transmission means provided in each embroidering hand for imparting to its needle holder one half of a revolution derived from the linear movement of the reciprocating embroidering hand; a spring device incorporated in each embroidering hand for operating a lever and transmitting therethrough to the needle holder a strong pressure for firmly grasping the embroidering needle, a weak pressure for permitting a longitudinal adjustment of the needle in the needle holder and no pressure at all for permitting the needle to be taken out of the needle holder; the said driving mechanism comprising a first eccentric for the embroidering hands and a second eccentric for the thread-pulling devices; a pair of crank shafts for the pairs of co-operating embroidering hands and a pair of crank shafts for the pairs of co-operating thread-pulling devices, and connecting rods between said eccentrics and said crank shafts as well as between the latter and the embroidering hands and the thread-pulling devices, respectively; the said first and second eccentrics consisting of a disk having an endless cam groove cut into each surface of said disk, and the said connecting rods being provided with guide pins engaging said cam grooves, of which the cam groove connected with the said crank shafts for operating the embroidering hands includes a first sharp-curve portion for causing the embroidering hands to be withdrawn to an intermediate position between the cloth to be embroidered and the end position of their return stroke, and a second sharp-curve portion for moving the embroidering hands from said intermediate position to its position adjacent said cloth.

6. Embroidering machine, comprising in combination at least one pair of co-operating mechanical embroidering hands, each provided with a rotative needle holder capable of handling a threaded embroidering needle having the needle eye provided at one end thereof and of inverting the direction of the needle after each passage through the cloth to be embroidered; a thread-pulling device associated with each embroidering hand, comprising two co-operating parallel rods and a composite thread-engaging roller carried by the free end of said rods and formed by two separable component parts provided with inter-engaging male and female portions, and a driving mechanism for reciprocating the embroidering hands and for oscillating the thread-pulling device; transmission means provided in each embroidering hand for imparting to its needle holder one half of a revolution derived from the linear movement of the reciprocating embroidering hand; a spring device incorporated in each embroidering hand for operating a lever and transmitting therethrough to the needle holder a strong pressure for firmly grasping the embroidering needle, a weak pressure for permitting a longitudinal adjustment of the needle in the needle holder and no pressure at all for permitting the needle to be taken out of the needle holder; the said driving mechanism comprising a first eccentric for the embroidering hands and a second eccentric for the thread-pulling devices; a pair of crank shafts for each pair of co-operating embroidering hands and a pair of crank shafts for each pair of co-operating thread-pulling devices, and connecting rods between said eccentrics and said crank shafts as well as between the latter and the embroidering hands and the thread-pulling devices, respectively.

EUGENIO GERBER.

References Cited in the file of this patent

UNITED STATES PATENTS

| Number | Name | Date |
|---|---|---|
| 507,825 | Miller | Oct. 31, 1893 |
| 1,523,535 | Eberhardt | Jan. 20, 1925 |